US011615373B2

(12) United States Patent
Malecha et al.

(10) Patent No.: US 11,615,373 B2
(45) Date of Patent: Mar. 28, 2023

(54) INVENTORY MANAGEMENT

(71) Applicant: Target Brands, Inc., Minneapolis, MN (US)

(72) Inventors: Gregory Malecha, Sunnyvale, CA (US); Abhijith Neerkaje, Minneapolis, MN (US); Aron Gruzman, San Francisco, CA (US); Ashwin Rao, Palo Alto, CA (US); Chandrashekar Tallichetty, Minneapolis, MN (US); Jeffrey Eul, Minneapolis, MN (US); Joseph Cox, Sunnyvale, CA (US); Shaokuan Chen, Minneapolis, MN (US); Tikhon Jelvis, Sunnyvale, CA (US)

(73) Assignee: TARGET BRANDS, INC., Minneapolis, MN (US)

( * ) Notice: Subject to any disclaimer, the term of this patent is extended or adjusted under 35 U.S.C. 154(b) by 574 days.

(21) Appl. No.: 15/975,604

(22) Filed: May 9, 2018

(65) Prior Publication Data

US 2019/0347606 A1 Nov. 14, 2019

(51) Int. Cl.
*G06Q 10/08* (2012.01)
*G06Q 20/20* (2012.01)
*G06Q 30/02* (2012.01)
*G06Q 10/087* (2023.01)
*G06Q 10/083* (2023.01)
(Continued)

(52) U.S. Cl.
CPC ......... *G06Q 10/087* (2013.01); *G06Q 10/083* (2013.01); *G06Q 20/203* (2013.01); *G06Q 30/0201* (2013.01); *G06Q 30/0223* (2013.01)

(58) Field of Classification Search
CPC .. G06Q 10/087; G06Q 20/203; G06Q 10/083; G06Q 30/0201; G06Q 30/0223
See application file for complete search history.

(56) References Cited

U.S. PATENT DOCUMENTS 5,819,232 A * 10/1998 Shipman ............... G06Q 10/04
705/7.24
5,970,465 A 10/1999 Dietrich et al.
(Continued)

OTHER PUBLICATIONS

He, Lin, Multi-Echelon Inventory Optimization and Demand-Side Management: Models and Algorithms, 2014, ProQuest Dissertations Publishing. (Year: 2014).*

*Primary Examiner* — Sangeeta Bahl
*Assistant Examiner* — Aaron N Tutor
(74) *Attorney, Agent, or Firm* — Merchant & Gould P.C.

(57) ABSTRACT

Methods and systems for managing inventory items within a supply chain are disclosed. One method includes receiving, at a software tool, inputs related to a plurality of inventory items, the inputs including a cost of holding each of the plurality of inventory items at a location type. The method includes determining, individually for each inventory item of a plurality of inventory items, an optimal inventory balance across a plurality of locations, wherein the optimal inventory balance is a predetermined statistical availability level set based on a desired customer availability of the inventory item. The method further includes automatically generating one or more inventory adjustment requests to achieve the optimal inventory balance across each of the plurality of locations for each of the plurality of inventory items.

19 Claims, 10 Drawing Sheets

(51) Int. Cl.
G06Q 30/0201 (2023.01)
G06Q 30/0207 (2023.01)

(56) References Cited

U.S. PATENT DOCUMENTS

| | | | |
|---|---|---|---|
| 7,668,761 B2 * | 2/2010 | Jenkins | G06Q 10/087 |
| | | | 705/28 |
| 2001/0047293 A1 * | 11/2001 | Waller | G06Q 20/203 |
| | | | 705/22 |
| 2002/0143669 A1 | 10/2002 | Scheer | |
| 2017/0109686 A1 * | 4/2017 | Kamadolli | G06Q 30/08 |
| 2019/0259043 A1 * | 8/2019 | Koneri | G06N 7/005 |

* cited by examiner

INVENTORY MANAGEMENT

TECHNICAL FIELD

The present disclosure is directed to methods and systems for managing supply chains. More particularly, the present disclosure describes a system architecture for managing an inventory management system on a per-SKU basis.

BACKGROUND

Retailers often carry a high level of inventory in stores' backrooms and/or distribution centers, but still experience an insufficient quantity of product or a surplus of products. Having an insufficient quantity of a product causes lost sales, while having a surplus of products also creates problems, such as increased costs for storage and lost profits if the product does not sell. Both of these situations results in additional costs for the retailer.

Inventory for both in-store and online sales is typically transported and stored in large groupings such as pallets. Often, inventory sits too long in some storage locations while in other locations the products run out much too quickly, and surplus demand is not met. Additionally, for locations where a product has a small but steady demand, it is inefficient to ship large quantities of the product to those locations at once, because most of the stock will go unused for a long period of time. By shipping a large amount to those locations at once, warehouses have to house inventory that is not needed immediately while other warehouses or stores might be short on that particular product.

Existing retail supply chain architectures require large amounts of additional stock to sit in warehouses and store rooms in order to meet customer demands for products. Storing inventory is costly, and if the inventory is not positioned well within the supply chain, delivery timeframes to customers can be lengthy. If customer demand can be predicted and the appropriate amount of product is available near the customer, less storage space is required without missing sales opportunities.

Still further, optimizing, or improving, inventory management can be made more difficult because demand for items may change over time, items may become unavailable at a specific location, or too many items are at a specific location. In view of the above-described challenges, managing inventory over multiple locations is an ongoing process in which improvements are continually sought, and a static model is generally unsatisfactory.

SUMMARY

In summary, the present disclosure relates to methods and systems for managing replenishment of inventory in a retail supply chain. Various aspects are described in this disclosure, which include, but are not limited to, the following aspects.

The present disclosure is directed to an order management system for managing inventory based on a per-item, per-SKU basis for store replenishment. The inventory management system comprises a plurality of separate determinative components to determine a distribution or likelihood for inventory and demand at each time period across a plurality of locations.

In an example aspect, a method of managing inventory items within a supply chain comprises receiving, at a software tool implemented on a computing system, inputs related to an inventory item. The inputs include a cost of holding each of the plurality of inventory items at a location type. The method further includes determining, individually for each inventory item of a plurality of inventory items, an optimal inventory balance across a plurality of locations, wherein the optimal inventory balance is a predetermined statistical availability level set based on a desired customer availability of the inventory item, and wherein the plurality of locations include a plurality of locations selected from among retail locations, receiving centers, and flow centers. The method also includes automatically generating one or more inventory adjustment requests to achieve the optimal inventory balance across each of the plurality of locations for each of the plurality of inventory items, the inventory adjustment requests being selected from among a transfer order or rebalance order to initiate movement of inventory items within the enterprise to move inventory items between locations, or a purchase order to a vendor to order additional inventory items.

In another example aspect, a non-transitory computer-readable medium comprising computer-executable instructions which, when executed by a computer system cause the computing system to perform a method of managing inventory items in a supply chain. The method includes receiving inputs, which include a cost of holding each of the plurality of inventory items at a location type. The method further includes determining, individually for each inventory item of a plurality of inventory items, an optimal inventory balance across a plurality of locations, wherein the optimal inventory balance is a predetermined statistical availability level set based on a desired customer availability of the inventory item, and wherein the plurality of locations include a plurality of locations selected from among retail locations, receiving centers, and flow centers. The method also includes automatically generating one or more inventory adjustment requests to achieve the optimal inventory balance across each of the plurality of locations for each of the plurality of inventory items, the inventory adjustment requests being selected from among a transfer order or rebalance order to initiate movement of inventory items within the enterprise to move inventory items between locations, or a purchase order to a vendor to order additional inventory items.

In a further aspect, a system for managing inventory items within a supply chain is disclosed. The system includes a computing system comprising at least one processor communicatively connected to a memory. The memory stores computer-executable instructions comprising a software tool which, when executed, causes the computing system to receive inputs related to a plurality of inventory items, the inputs including a cost of holding each of the plurality of inventory items at a location type, and determine, individually for each inventory item of a plurality of inventory items, an optimal inventory balance collectively across a plurality of locations based on a predetermined restocking time period, wherein the optimal inventory balance is a predetermined statistical availability level set based on a desired customer availability of the inventory item, and wherein the plurality of locations include a plurality of locations selected from among retail locations, receiving centers, and flow centers. The computing system further automatically generates one or more inventory adjustment requests to achieve the optimal inventory balance across each of the plurality of locations for each of the plurality of inventory items, the inventory adjustment requests being selected from among a transfer order or rebalance order to initiate movement of inventory items within the enterprise to move inventory items between locations, or a purchase order to a vendor to order additional inventory items.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
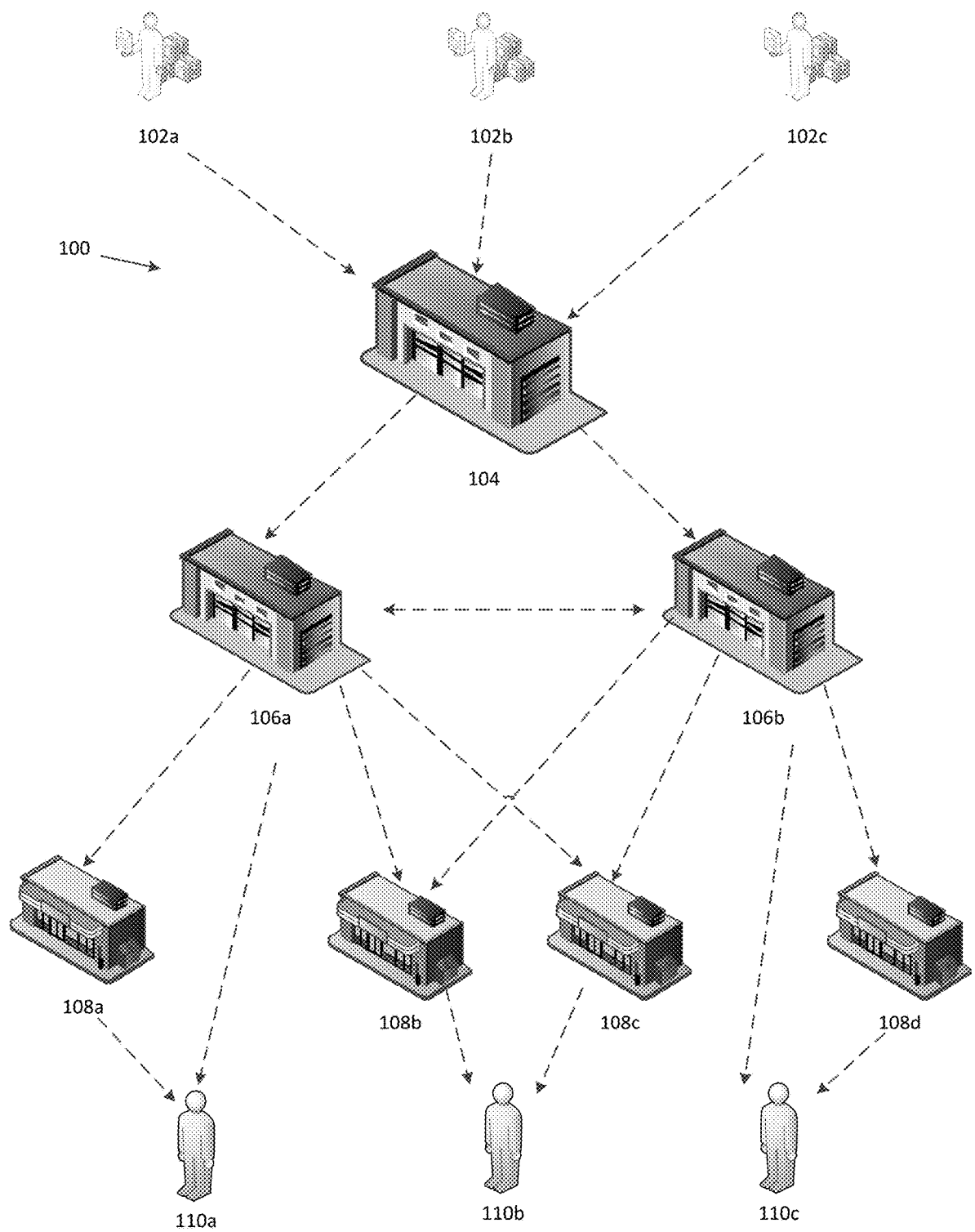
FIG. 1 illustrates a schematic diagram of an example supply chain for a retail enterprise.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

An inventory management system of the present disclosure utilizes an architecture of established retail sites, established flow centers associated with the retail sites, established receive centers for receiving product from vendors, and established hauling routes between receive center, retail sites, and flow centers. The inventory management system uses dynamic, stochastic modeling to determine a distribution for inventory and demand at each time period on a per-SKU basis.

The product transfer order reflects the most cost effective handling option for the picking/sorting, packing, shipping and delivery of the digitally ordered products as determined by the reactive cost analysis. In certain embodiments, the most cost effective handling option is selectable from options that include: "local injection," "store pack with local injection," "ship injection," "merge in transit from upstream" and "merge in transit local". In certain examples, each of the handling options is considered with the goal of maximizing the volume for local injection of fulfilled orders from a primary retail site that is closest to a delivery address associated with the digital order.

The inventory management system of the present disclosure allows companies to operate an entire supply chain on a "need-basis" separated by product category, in which the company does not need to store an excess amount of product. The inventory management system is implemented on a data communication network that serves as the center for connectivity between the supply chain participants. The system includes a collection of functions and features implemented in software and/or hardware that make the operation and management of the supply chain as automated.

In general, the present disclosure relates to methods and systems for determining per-SKU, per store forecasts on a daily basis for purposes of determining inventory movement requirements. In particular, the supply chain is for a collection of retail stores that also operates an online ordering system. The inventory management system operates to monitor and manage inventory levels in a plurality of nodes. Nodes can include retail stores and warehouses. Warehouses serve to store inventory and also function as distribution centers. The distribution centers can have particular purposes such as a receive center for receiving products from vendors and preparing them for distribution to other nodes, or a flow center for holding individual, unit level inventory stock on a short term basis, for distribution to retail stores and individual customers. The inventory management system determines how much inventory is needed at each store on daily basis, such that the entire system need not recalculate inventory requirements in response to each individual event. The movements of inventory can be based on expected demand as well as reactions to actual demand from customers.

The methods and systems described herein provide an event-driven architecture for real-time replenishment of inventory. The system is both proactive and reactive. Demand forecasting is utilized to anticipate customer demand at each location for each item. In addition, the system reacts to each individual sale to replenish stocks as needed based on actual demand. The same stocks of inventory are utilized to fulfill needs for both in-store and online sales. Inventory stocks are continually rebalanced throughout the supply chain in order to position items in locations where they are mostly likely to be needed in order to reduce shipping time and storage time. The methods and systems described herein provide efficiencies in inventory management system that unexpectedly allow for both a reduction in the amount of inventory that is stored at any time while also being able to respond more quickly to customer demand.

FIG. 1 illustrates a schematic diagram 100 of an example supply chain for a retail enterprise. The diagram 100 illustrates the flow of inventory from vendor 102 to customer 110. The inventory moves through various nodes to arrive at the customer. In this example, the nodes include a receive center 104, two flow centers 106a, 106b, four retail stores 108a, 108b, 108c, 108d, and three customer residences 110a, 110b, 110c. In practice, the supply chain could include many more nodes in different proportions. In some embodiments, there are not separate receive centers and flow centers. Instead, there may be one type of warehouse or distribution center for holding inventory before distributing to stores and customers. Arrows in the diagram indicate movement of inventory. Inventory will typically flow downward through the supply chain, but in some instances inventory may move between flow centers 106 or between retail stores 108. In some embodiments, inventory may even move from a flow center 106 to a receive center 104 or from a retail store 108 to a flow center 106.

Vendors 102 produce/provide the items or products that will be sold by the retail entity. A purchase order is typically placed to request products from a vendor. In some instances, the vendor 102 will transport the ordered products to a receive center 104. In other instances, the retail entity arranges for the products to be picked up from the vendor 102 and transported to the receive center 104. Once at the receive center 104, the products are prepared for transportation to one or more flow centers. The products may arrive from the vendors in large groupings that need to be broken down into individual units for distribution to flow centers 106 and/or stores 108. Accordingly, once received into the supply chain of the enterprise, each individual unit can be tracked and shipped among the various nodes of the supply chain (receive centers 104, flow centers 106, and stores 108).

A variety of products are prepared for shipment to one or more flow centers 106. The flow centers 106 are typically positioned to enable quick shipment to one or more retail stores 108. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. Flow center 106b distributes to stores 108b, 108c, and 108d. In some instances, to the extent products received at a flow center 106 are not already broken down into individual units, the products may be broken down into individual units in order to distribute individual items to stores 108, or optionally to fill online orders that will be delivered directly to customers from the flow center 106 or store 108. In the example of FIG. 1, products are shipped directly from flow center 106a to a customer 110a and from flow center 106b to customer 110c.

Once products arrive at the retail stores 108, they are either stored in a back room or displayed on shelves. This inventory is available for in-store purchases, pick-up orders, or local delivery. Depending on the location of a customer ordering products online, the shipments of products could come from one or more retail stores 108, or flow centers 106. For instance, customer 110b could receive shipments of products from either store 108b or store 108c, or both (in the instance of a multi-item purchase).

It is noted that, between receive centers 108, flow centers 106, and stores 108, there may be preexisting, predetermined delivery routes established. For example, there may be daily or weekly transit routes between a receive center and one or more flow centers. The receive center can provide to the flow centers the selection of individual items that are needed by stores 108 serviced by the one or more flow centers proximate to and/or servicing those stores. The flow centers can also have daily or other periodic transportation routes established to stores that are serviced, thereby ensuring prompt replenishment of items at stores in response to item sales.

In addition, the predetermined delivery routes can be used for various purposes. For example, in some situations, the predetermined delivery routes can be used to deliver products in various forms. As explained in further detail below, items distributed via the supply chain are tracked on an individual (per-item) basis; as such, items can be delivered to stores 108 in any convenient manner. In some example embodiments, items are tracked on an individual basis, but may be grouped at a flow center 106 to simplify restocking of the store 108, for example by placing together in a package a collection of individual items of different types but which may easily be stocked conveniently once those items arrive at a store 108. For example, goods that are located in a common department, row, or shelf of a store can be grouped and packed together at the flow center 106. Once those items reach the store 108, a restocking operation can restock each of the items in that shelf, row, or department easily. Still further, because items are packed and tracked on an individual basis at the flow center and sent to stores based, at least in part, on demand signals received from stores, the item collections are based on the number of items sold and therefore the restocking operation can provide a package of items that will fit on store shelves, rather than requiring additional backroom stocking and storage.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between paints both within and external to the supply chain. Accordingly, as noted below, substantial advantages are realized using the methods and systems of the present disclosure.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. In other embodiments, the systems and methods could operate for distribution channels that distribute supplies to multiple locations within a business rather than selling to individual customers. Regardless of the application, the systems and methods described herein are most beneficial when used to manage a supply chain for a plurality of nodes with the goal of increasing efficiency of inventory movement by responding to both proactive and reactive demand signals in real time.

Figure 2:
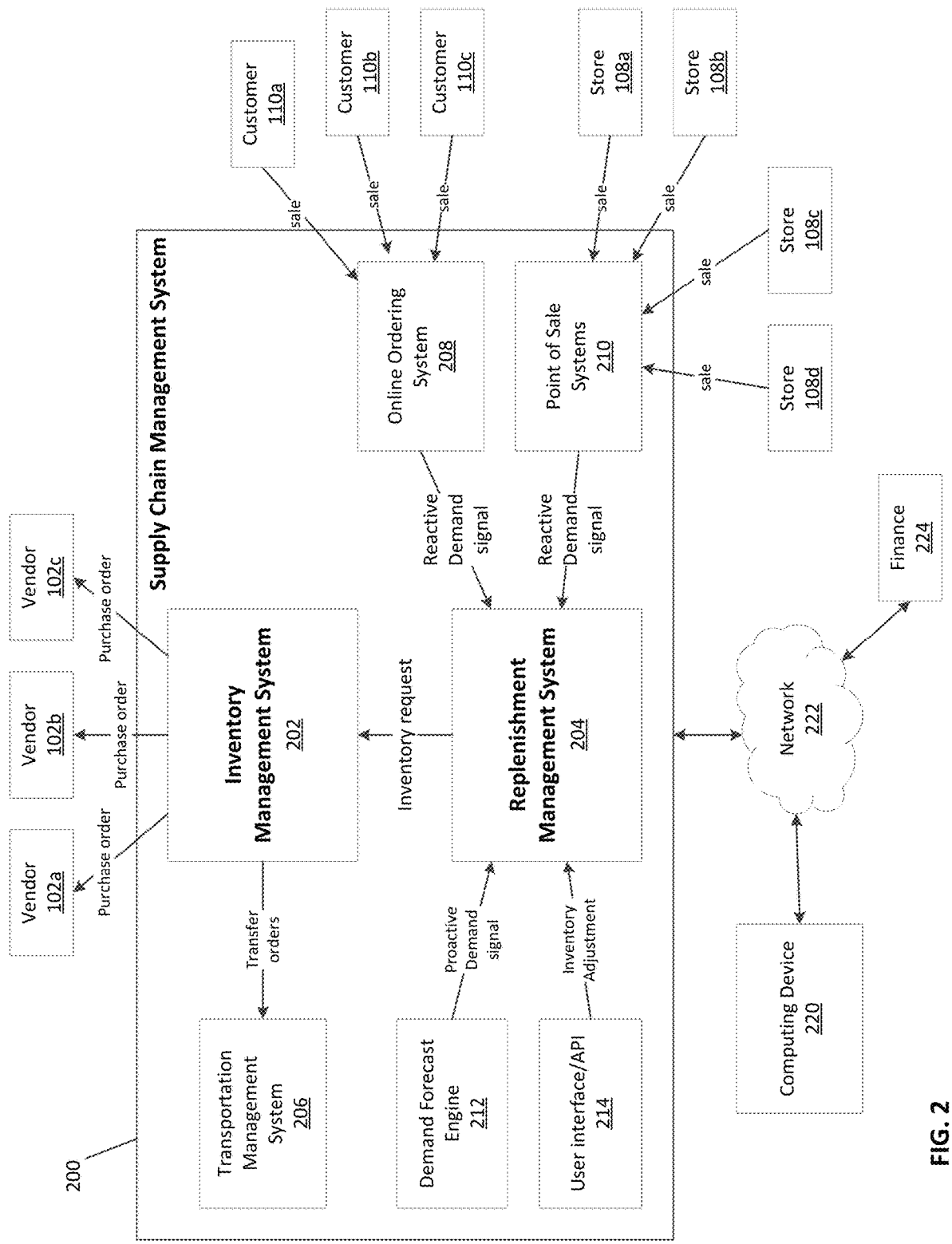
FIG. 2 illustrates a schematic diagram of an example supply chain management system.

FIG. 2 illustrates a schematic diagram of an example system 200 for managing a supply chain. Components of the supply chain management system 200 include an inventory management system 202 and a replenishment management system 204. Together, the inventory management system 202 and replenishment management system 204 operate to monitor inventory levels across all nodes of a supply chain, determine if and when adjustments to inventory levels need to be made, and facilitate transport of inventory between nodes to respond to customer demand.

The inventory management system 202 receives inventory requests from the replenishment management system 204. In response to the inventory requests, the inventory management system 202 determines whether additional inventory is needed at one or more nodes within the supply chain to satisfy the request. Additional inventory may be transported to one node from another node if sufficient stock of the needed product(s) is available within the required timeframe within the supply chain. In such instances, transfer orders are issued to the transportation management system 206. If the inventory management system 202 determines that there is not sufficient stock of the requested products at another node or that transporting the products within the supply chain would be too costly or time consuming, additional stock is ordered from one or more vendors 102 through purchase orders issued from the inventory management system 202. The inventory management system 202 is further described with respect to FIG. 3.

In the embodiment shown, the replenishment management system 204 receives demand signals from one or more sources including an online ordering system 208, one or more point of sale systems 210, and a demand forecast engine 212. The demand signals can be proactive or reactive. Proactive demand signals are received from the demand forecast engine 212 and are generated by predicting expected customer demand for individual products on a day by day basis. Reactive demand signals are received from the point of sale system 210 (e.g., a point of sale network distributed across stores 108 within the enterprise) or through the online ordering system 208. The online ordering system 208 receives orders from customers 110 and coordinates fulfillment of those orders. The point of sale systems 210 record sales that are made at stores 108. The replenishment management system 204 also receives inventory adjustments from a user interface 214. Inventory adjustments are instructions received from a user to modify inventory levels at one or more locations or nodes within the supply chain. Inventory adjustments may be made for reasons other than expected or actual customer demand for particular items. The replenishment management system 204 is further described in connection with U.S. patent application Ser. No. 15/898,837, entitled "Method and System for Supply Chain Management", the disclosure of which is hereby incorporated by reference in its entirety.

Figure 7:
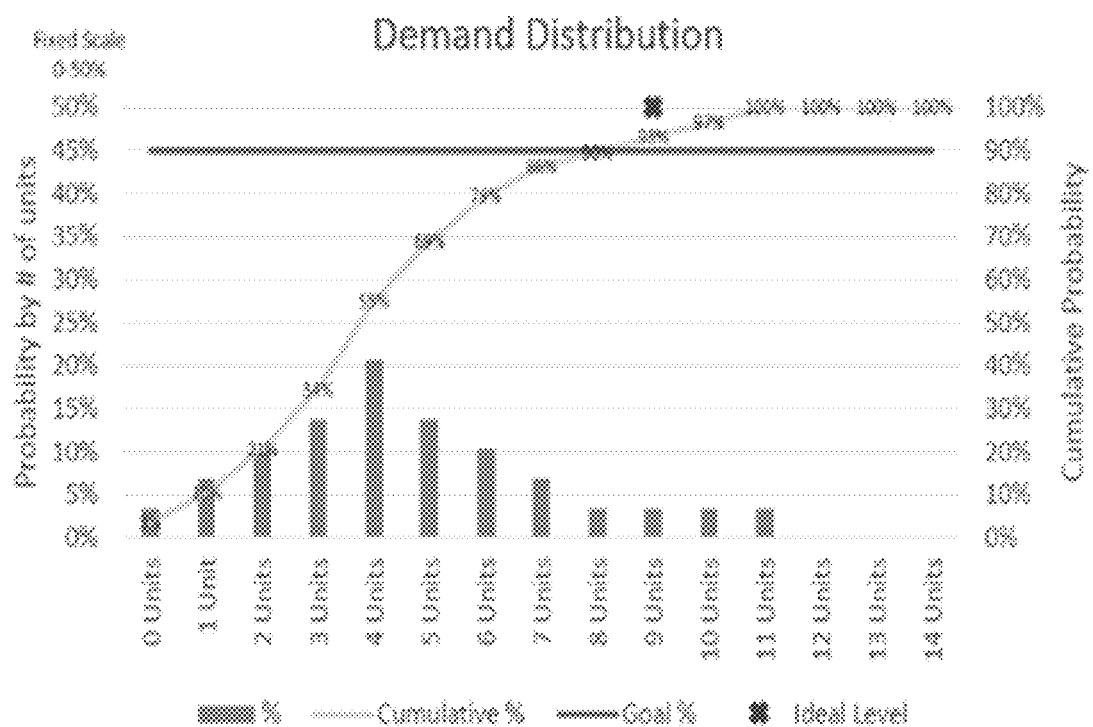
FIG. 7 is a histogram of an example demand probability distribution.
Figure 8:
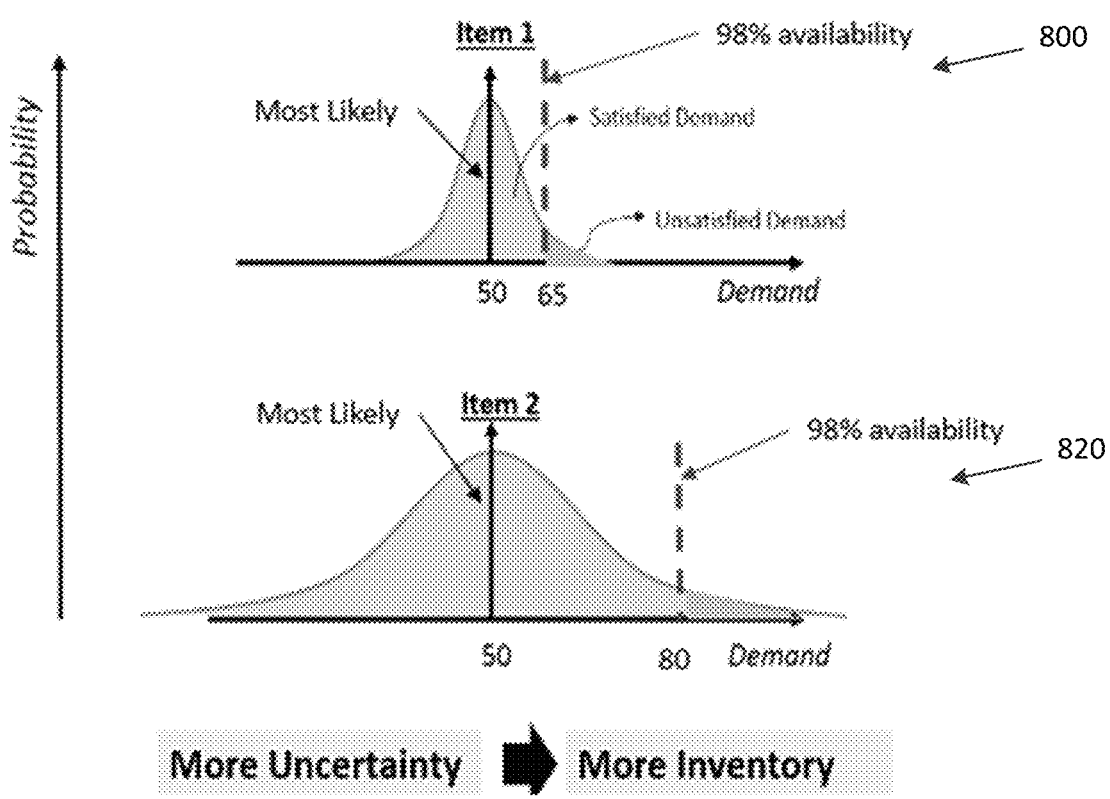
FIG. 8 is an example graph of demand distributions for two different items.
Figure 9:
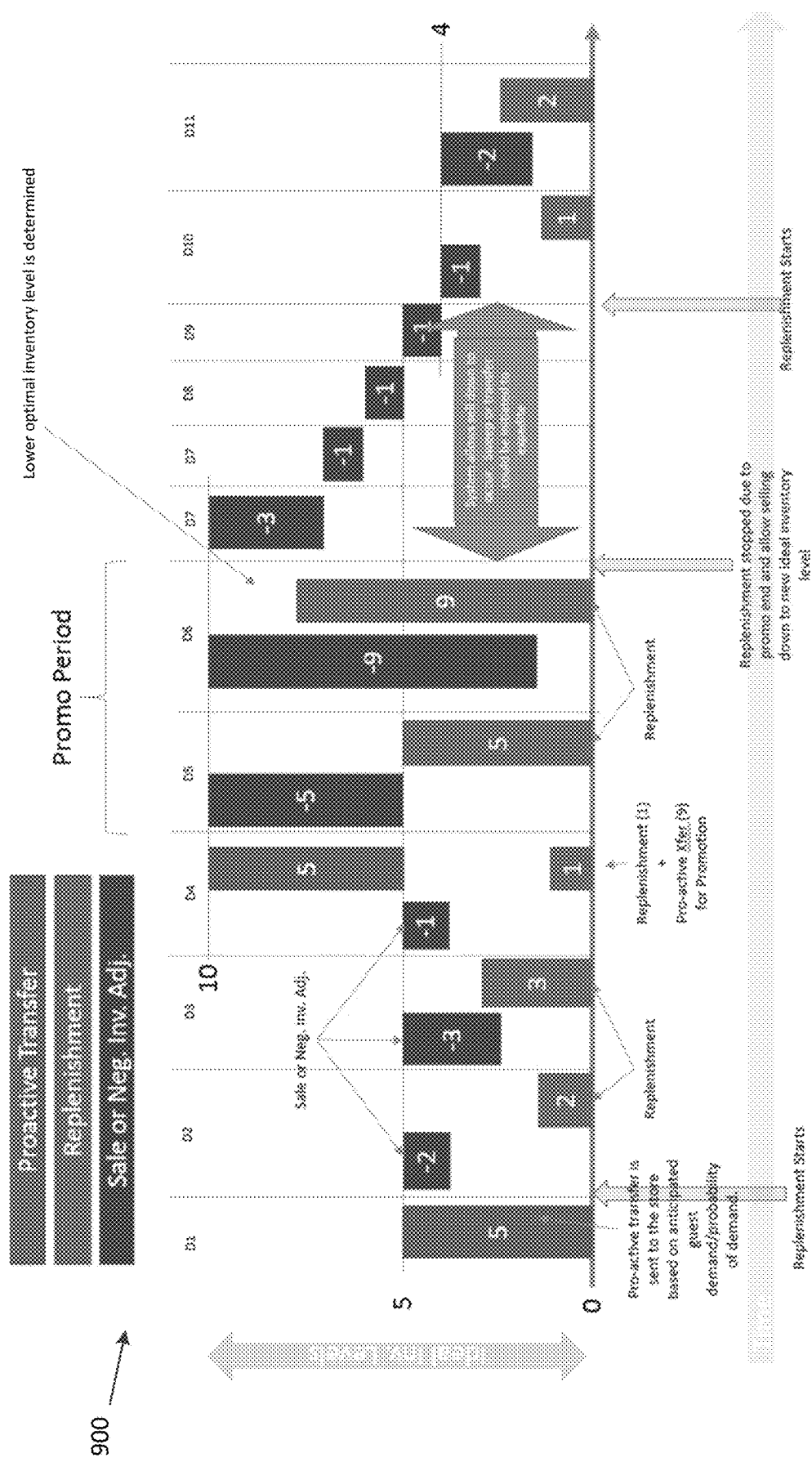
FIG. 9 is a graph illustrating the replenishment process of a new item according to the method of FIGS. 5-8 as performed by the system of FIGS. 2-3 in a retail store.

In some embodiments, the user interface 214 can provide inventory management inputs for an administrative user of the supply chain management system. For example, the user interface 214 can provide user access to view and set inventory levels and inventory fulfillment thresholds for retail locations in the supply chain, either individually or collectively. In some instances, a user can view current per-item inventory at one or more locations, forecasts for the one or more selectable items, and adjust such inventory levels by adjusting a fulfillment threshold for the item (e.g., a statistical percentage of customer attempted purchases that are successfully fulfilled). Example user interfaces can depict such statistical distributions or inventory levels, such as are shown in FIGS. 7-9.

In some embodiments the supply chain management system 200 communicates with a computing device 220 through a network 222. The network 222 can be any of a variety of types of public or private communications networks, such as the Internet. The computing device 220 can be any network-connected device including desktop computers, laptop computers, tablet computing devices, smartphones, and other devices capable of connecting to the Internet through wireless or wired connections. In some instances, the supply chain management system 200 also communicates with a finance system 224 through the network 222.

Figure 3:
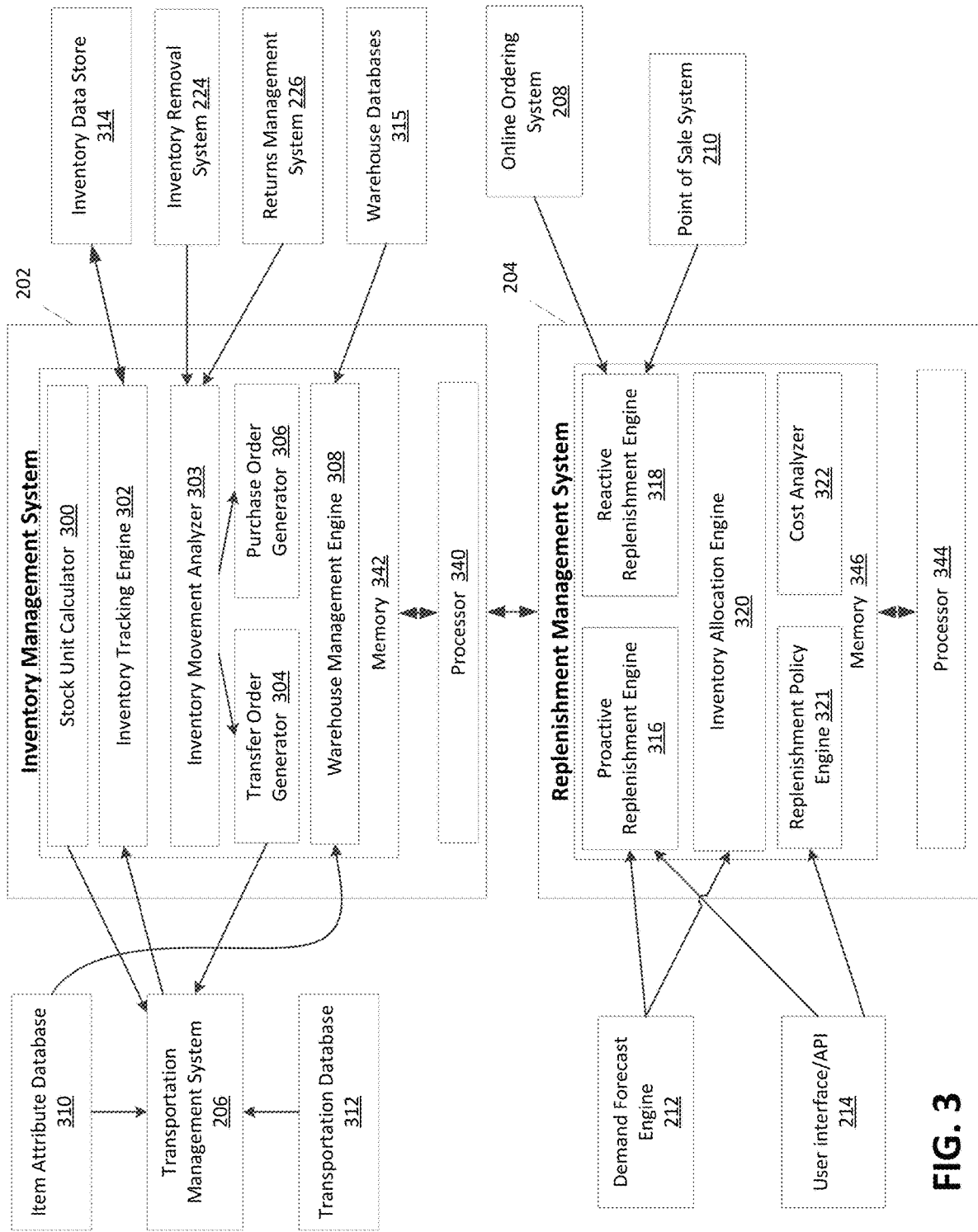
FIG. 3 illustrates a more detailed view of the inventory management system of FIG. 2.

FIG. 3 shows a detailed schematic of example embodiments of the inventory management system 202. The inventory management system 202 includes a stock unit calculator 300, an inventory-tracking engine 302, inventory movement analyzer 303, a transfer order generator 304, a purchase order generator 306, and a warehouse management engine 308.

The inventory management system 202 is implemented on one or more computing systems within an enterprise network. Accordingly, the inventory management system 202 includes a processor 340 and memory 342 operatively connected to the processor, and storing operating instructions that implement the operative components (300-308, above) of the system 202. An example computing system or systems with which system 202 can be implemented is illustrated below in connection with FIG. 4.

The stock unit calculator 300 operates to determine the appropriate unit of measure in which each product should be transported and stored. In response to real-time events, inventory must be moved from place to place. By determining the amount of inventory that needs to be distributed, the proper unit of measure can be determined. In some cases, a node will need large batches of a particular item due to high demand. In such cases, full pallets could be transported. In other cases, a node may only need one or two of an item at a time. In those instances, the proper unit of measure is the individual units. The stock unit calculator 300 communicates with the inventory allocation engine 320 to determine storage requirements based on future demand forecasts for each product.

The stock unit calculator 300 will leverage predicted inventory movement to determine the appropriate unit of measure for storage and movement. The unit of measure determines items and quantities that should be stored in pallets, cartons, or broken down into eaches. Additionally, the stock unit calculator 300 determines when it is advantageous to round the unit of measure up to the next largest denomination. For example, pallets of bottled water arrive at a receive center. High volume stores will sell through 1-2 pallets while low volume stores will sell through 5-6 eaches between deliveries. Based on the probability of future demand, the stock unit calculator 300 determines how many pallets should be broken down into cases or eaches for storage in the receive center. This enables faster loading of trucks for delivery to flow centers and stores so that the products do not have to be broken down into smaller units further down the supply chain.

The inventory-tracking engine 302 operates to monitor inventory levels at each warehouse and store in the supply chain. The inventory-tracking engine 302 also receives inputs from the transportation management system 206 regarding the movement of inventory between nodes. Inventory coming into the supply chain from vendors or returns is recorded by the inventory tracking engine 302 as well as inventory leaving the supply chain to satisfy sales or inventory removal. Updates to inventory records are saved in an inventory data store 314. The inventory-tracking engine 302 serves as a single source of information for that status of every aspect of inventory within a supply chain for a retail enterprise.

The inventory movement analyzer 303 receives status updates from the inventory-tracking engine 302 and analyzes the changing inventory levels at each node within the supply chain to determine if any inventory movements are needed based on current inventory levels at the plurality of nodes, as well as desired inventory levels at each of those nodes. The inventory movement analyzer 303 receives inventory requests from the replenishment management system 204, the inventory removal system 224, and the returns management system 226. Based on these inventory requests, the inventory movement analyzer 303 determines whether the inventory levels are at their preferred levels. The preferred levels are determined on a per-item basis periodically; in some instances, preferred levels are determined alongside current inventory levels for each day. The inventory movement analyzer 303 evaluates the current inventory levels at each node and compares them to that day's goal and the following day's goal to determine if inventory movements need to be changed to redistribute inventory.

The inventory movement analyzer 303 also determines how items should be moved between nodes of the supply chain, based on the inventory goals. Inventory goals can be set, for example, based on output from an inventory allocation engine 320, described in further detail below. If inventory is available within the supply chain to satisfy an inventory request and the costs are not too high to move the inventory, the inventory movement analyzer 303 will send a signal to the transfer order generator 304. If the inventory movement analyzer 303 determines that there is insufficient supply of an item within the supply chain to satisfy an inventory request or that the cost of moving items outweighs the cost of ordering new stock, the inventory movement analyzer 303 sends a signal to the purchase order generator 306.

The inventory removal system 224 and returns management system 226 provide inputs to the inventory movement analyzer 303 to request the movement of inventory within the supply chain. The inventory removal system 224 is responsible for removing items from the supply chain. In some instances, the items will be automatically removed after a period of time, for example, after a predetermined shelf life for perishable produce and other fresh grocery items. In other instances, the items are removed after the inventory removal system 224 receives a notification to remove one or more items from the supply chain. For example, one or more seasonal items may be removed at the conclusion of a particular shopping season. In another example, as discussed below, the items could be removed following a return if the items are no longer in condition for re-sale to another customer. Items may need to move to different nodes in order to be properly removed from the supply chain.

The returns management system 226 operates to determine how to redistribute items that have been returned by customers following a purchase. In some instances, the returned item or items are transferred to other nodes or remain where they were received from the customer. Those items are then made available for re-sale to another customer. In other instances, the returned item or items are not eligible for re-sale and are marked for removal from the supply chain by the inventory removal system 224.

The transfer order generator 304 communicates with the transportation management system 206 to transfer stock of products from one node to another. Transfer orders are generated when the inventory management system 202 has received an inventory request and the inventory movement analyzer 303 has determined that the additional inventory can be moved from another node.

The purchase order generator 306 sends orders to vendors for additional stock of products. Purchase orders are generated when the inventory management system 202 has received an inventory request and the inventory movement analyzer 303 in conjunction with the cost analyzer 322 has determined that it would be more cost and/or time efficient to get the additional inventory from a vendor than from another node. Purchase orders are communicated to the transportation management system 206 in order for transportation of the products from the vendor to a receive center to be arranged.

The warehouse management engine 308 manages all events that occur at a warehouse or distribution center in the process of moving inventory through the supply chain. The functions of the warehouse management engine 308 differ for each node depending on that node's role. Warehouse operations are different between receive centers, flow centers, and storage in retail stores. The warehouse management system 308 relies on information supplied by the item attribute database 310 and warehouse databases 315.

Warehouse management engine 308 can define optimal vendor case configuration and make recommendations for the purchase order generator 306. For example, when a receiving center 104 is receiving 1000 units (100 cases on 10 pallets), the warehouse management engine 308 determines that the receiving center 104 should prepare 500 units to the each level (eaches), leave 1 pallet whole, and store the remaining 400 units as cases.

Inbound processing typically occurs at receive centers and flow centers as items are shipped in from vendors or are transferred from other nodes within the supply chain. The inbound process handles inventory that is to be put into storage at a distribution center or warehouse. The purpose of the inbound functions of the warehouse management engine 308 are to quickly get items into the warehouse, confirm quality of goods and all associated data, prepare goods if needed for downstream movement and proper unit of measure, direct items to the correct storage area, and accurately put into a location that maximizes cube utilization. Once these functions are completed, inventory is reported to the inventory data store 314 for recordation as available stock.

Inbound processing typically occurs at receive centers and flow centers as items are shipped in from vendors or are transferred from other nodes within the supply chain. The inbound process handles inventory that is to be put into storage at a distribution center or warehouse. The purpose of the inbound functions of the warehouse management engine 308 are to quickly get items into the warehouse, confirm quality of goods and all associated data, prepare goods if needed for downstream movement and proper unit of measure, direct items to the correct storage area, and accurately put into a location that maximizes cube utilization. Once these functions are completed, inventory is reported to the inventory data store 314 for recordation as available stock.

For vendor loads, purchase order specific instructions are delivered from the inventory management system 202 that dictate the unit of measure it should be stored in as well as indicates if freight is crossdock and should be moved through the facility to be received and prepped at another node. Non-crossdock vendor freight is unloaded and sorted for receiving based on the physical size, storage unit of measure, and preparation requirements of the goods. This information is accessed from the item attribute database 310. Throughout these processes, the warehouse management engine 308 and transportation management system 206 is providing real-time updates to the inventory-tracking engine 302, which records the updates in the inventory data store 314. The inventory data store 314 serves as the single source of truth for inventory ownership supplying all other aspects of the supply chain management system 200.

In the put away process, the role of the warehouse management engine 308 is one of accuracy and tracking rather than direction. Put away from either transfer or vendor loads looks the same, only differentiated by unit of measure and size (each, case, pallet, S/M/L/XL). Inventory is now accurately located in the correct unit of measure, prepared for future movement, and is available for the online ordering system 208 to allocate against.

The outbound functions of the warehouse management engine 308 are more complex based on the need for optimization to occur. Tight control and coordination of operational activities are necessary to meet ease of customer handling requirements without massive buffers or long cycle times. The outbound cycle begins by receiving movement instructions the inventory movement analyzer 303. These can be either replenishment, proactive transfers, or reactive transfers but all types include the item, quantity, unit of measure specification, destination, any customer requirements (i.e., gift-wrapped), and need by time information. The warehouse management engine 308 receives these instructions throughout the day as sales and guest orders occur.

Due to the complexity of merging both stores replenishment and direct to guest operations, sequencing requirements for store ease of handling, the need to balance throughput across the operation, and tight cycle time requirements the warehouse management engine 308 employs sophisticated "sort" logic. This logic dynamically assesses orders in the pool and the operational constraints of all outbound functions in the facility. Based on this, it groups work and drops it to the floor to begin the pick process based on an optimized understanding of how that work will move through sortation, packing, and shipping functions to ultimately generate a completed easy to handle vessel that can be loaded onto a trailer without the need for massive buffers or overbuilt throughput.

For goods that require sortation after the picking operation but prior to the packing operation, the warehouse management engine 308 communicates with the sorter controls alerting it to the necessary destination within the facility of any inducted freight. The sorter then executes these physical movements and goods arrive at the correct packing station, at the right time, to be merged with other goods during packing to complete a store or guest order.

In the packing operation, the warehouse management engine 308 operates in conjunction with the transportation management system 202 to optimize use of space in trailers and other transportation equipment. Vessel sizes are selected that ensure product protection while minimizing cube loss (internal and external). Completed pack vessels are directed to the appropriate ship sequencing area of the warehouse where the final step of sequencing occurs to complete the ease of handling requirement. Once groupings are completed at the physical vessel level, the transportation management system 202 directs the loading of vessels onto the trailer in the appropriate order for later unloading.

The transportation management system 206 receives instructions from the inventory management system 202 to transport inventory between nodes of the supply chain. This includes shipping stock from vendors to warehouses to stores and then to customers. The transportation management system 206 receives transfer orders and purchase orders from the inventory management system 202 and arranges for the transportation of the requested products. As mentioned above, the transportation management system 206 operates in conjunction with the warehouse management engine 308 to coordinate packing and unpacking of trailers at warehouse locations.

The transportation management system 206 determines the best way to move items from place to place within given time periods in the most cost effective way. The system balances speed, service, and cost levels to drive optimal outcomes for inventory movement. The transportation management system 206 ensures that shipments of inventory arrive by critical "need-by" times dictated by the level of service associated with a customer order.

The transportation management system 206 accesses information about the items to be shipped from the item attribute database 310. Item attributes include information about whether particular items need to be temperature controlled (e.g. freezer), whether the items contain hazardous materials and require special handling, whether the items are flammable, the items' dimensions and weights, whether the items are bulky, etc.

The stock unit calculator 300 provides information regarding the number of individual units per pallet or other unit of measure of multiple items is included. Some items are stored individually while others are typically stored and shipped in multiples. For example, small items like towels might be packaged into boxes of 12 and those boxes are then packaged into pallets of 8 boxes.

The transportation management system 206 accesses information in the transportation database 312 to select proper transportation equipment for conveying the required items to their destination. Transportation equipment is selected based on the attributes of the items as well as cost, availability, etc. The system schedules deliveries of shipments and executes delivery services tailed to each node and recipient. To schedule the transportation of inventory, the system selects a carrier service based on the expected transit times and transit expenses. The system also optimizes routing to consolidate trips and create multi-stop opportunities to increase efficiency.

The transportation management system 206 handles arrangements for obtaining items from vendors and ensuring that the items arrive at the appropriate warehouses within an appropriate timeframe while minimizing costs. The transportation management system 206 sends purchase orders to vendors and schedules pick-up times for receiving the ordered items. A pick-up window or time is determined based on the need-by-time and anticipated transit times, as well as the vendor hours and ship point constraints.

The transportation management system 206 also determines which types of transportation equipment are needed to transport the ordered items from the vendor to the warehouse. For example, the equipment may need to handle hazardous items or temperature sensitive items. In addition, the equipment must be sized appropriately to handle the number of items that are being received by the vendor. In some instances, the equipment may be scheduled for more than one pick-up, so the equipment must be compatible with all of the items that it is scheduled to pick up. The system will determine which warehouse the vendor items are to be delivered in ordered to position the items for more efficient distribution to other warehouses and retail stores.

An item attribute database 310 stores information about attributes of the items or products that are being shipped and sold within the supply chain. Attributes of the products include weight, volume, units, and whether particular handling is required. Special handling may be required for items that require refrigeration, items that are flammable, or other hazardous materials in items. The transportation management system 206 relies on information in the item attribute database 310 to select equipment for transporting items as well as managing storage of the items in warehouses.

A transportation database 312 stores information about transportation equipment, transit times, delivery schedules, personnel, and outside contractors. The transportation equipment includes trucks, trailers, and other delivery equipment. Transit times are calculated for regular shipments as well as "milk runs" or extra rush deliveries as well as transit times that are required if using outside contractors. Delivery schedules include regular deliveries within the supply chain, vendor availability windows, and warehouse operating hours. Personnel information includes data for available personnel to staff the transportation equipment, cost of using internal personnel, and cost of hiring outside contractors.

The transportation database 312 also stores information related to transit lead times for each movement arc within the network. For example, transit times from a vendor 102 to a receive center 104, a receive center 104 to a flow center 106, and from a flow center to a retail location 108 are stored. Transit times are determinate based on the item characteristics, as some items may need to additional lead-time for transport (i.e., hazardous or flammable materials). The transportation database 312 also stores the cost of moving inventory across each node based on the time of the year, the amount of inventory moved, and the item characteristic.

The inventory data store 314 houses information about current inventory levels at all of the nodes within the supply chain. Inventory levels are recorded for each item or product. The inventory data store 314 is continually updated by the inventory-tracking engine 302 and provides a real-time view of the status of inventory levels across all nodes within the supply chain.

Warehouse databases 315 store information about warehouses (distribution centers) within the supply chain. The information includes data about available storage space, availability of specialized storage space (e.g. refrigerator or freezer space), and whether certain areas within the warehouse are reserved for particular items or purposes. The inventory management system 202 utilizes the warehouse databases 315 to determine loading orders of products in trailers and communicates that information to the transportation management system 206. The warehouse databases 315 are also used in conjunction with the stock unit calculator 300 to determine proper units of measure for storing products in distribution centers.

The replenishment management system 204 includes a proactive inventory replenishment engine 316, a reactive inventory replenishment engine 318, an inventory allocation engine 320, a replenishment policy engine 321, and a cost analyzer 322. The replenishment management system 204 also includes a processor 344 operatively connected to a memory 346. The replenishment management system 204 receives demand signals from the demand forecast engine 212, the point of sale system 210, and the online ordering system 208. The replenishment management system 204 receives further instructions from the user interface 214.

The proactive replenishment engine 316 receives proactive demand signals from the demand forecast engine 212 and user interface 214. These demand signals come in the form of a forecasted demand probability distribution that is determined for each item, at each location, for a given timeframe. Demand probability distributions are further described below. The demand probability distributions are utilized by the inventory allocation engine 320 to determine the optimal inventory positions of each item in the supply chain. The proactive replenishment engine 316 operates to ensure that inventory is replenished to keep up with anticipated demand.

A proactive transfer moves goods within the supply chain in advance of demand so that the proper amount of safety stock exists at each location. Stock is preferably moved along existing travel routes between nodes of the supply chain. This provides efficiency as well as tremendous flexibility to rebalance inventory throughout the network, eliminating out of stocks while lowering overall inventory levels.

The reactive replenishment engine 318 receives reactive demand signals from the point of sale system 210 and the online ordering system 208. Reactive replenishment ensures that stock levels remain at the preferred levels to meet customer availability goals.

A reactive transfer or shipping injection occurs as response to a reactive demand signal from a customer order made online or a purchase made in-store. For a reactive transfer, the reactive replenishment engine 318 sends a request to the inventory management system 202, but the full order cannot be completed at a single node. Therefore, portions of the order move through the network to land at a final processing node (normally the store) for combination and final order completion. This can happen through multiple echelons of the supply chain and the difference in lead time between a reactive transfer coming from receive center through flow center to store (2+ days) or from flow center to store (1+ day) is messaged to the online customer through the "promise" or guaranteed delivery date. Once all portions of an order have arrived at the final processing node via reactive transfer and the order can be completed, it is combined, processed, and sent out for delivery.

Shipping injection refers to a guest order that is fully complete and ready for guest delivery. The process is very similar to that of a reactive transfer but rather than doing final order combination from parts at the store, the order is combined, processed, and completed further upstream and sent downstream in its completed state ready for injection without additional store processing prior to being sent from the store for local injection.

Specific sequencing of reactive transfer orders within the supply chain are optimized to maximize opportunities to hit outbound trailers and processing windows within the operation. For example, reactive transfers can bypass put away and storage without compromising the ability to sequence store freight by being loaded directly into a vessel that is kept open throughout the load. This reactive vessel is loaded just prior to trailer close ensuring that every possible minute is available for reactive transfers to make the trailer cut. This strategy allows reactive transfers to represent a "magic bullet" through the supply chain consistently being the last orders on outbound shipments and the first orders off inbound shipments.

The inventory allocation engine 320 operates to determine optimal inventory positions by item, location, and timeframe for each node within the supply chain. The inventory allocation engine 320 relies on demand probability distributions from the demand forecast engine 212 to inform decision-making about the position of inventory within the supply chain. The inventory allocation engine 320 also modifies the optimal inventory positions based on accessing policies from the replenishment policy engine 321.

In example embodiments, the inventory allocation engine 320 can either perform a stochastic analysis of required inventory to reach a predetermined statistical threshold of satisfied demand, or receive such an analysis from the demand forecast engine 212. In some example embodiments, the required inventory is determined to meet demand at a 98% level (i.e., 98% of the time, demand is satisfied). The inventory goals could change from day to day for each item and node location.

The forecasted demand probability distribution must be determined for each item, at each location, for a given timeframe. This demand probability distribution may change based on time of year due to promotions, holidays, etc. The cost of holding inventory at each location for each item at different times of year must be determined. The inventory allocation engine 320 operates in conjunction with the cost analyzer 322 to compare various costs. This informs the decision of whether to hold inventory upstream in a flow center or receive center rather than keeping additional stock at the store.

The availability goal for each item at each location for different time periods must also be determined. This applies to both online and in-store purchase. The availability goal determines how much stock is needed to meet an expected demand from customers. The current inventory levels must be determined for each node and the amount of time it will take to transport inventory between nodes must be determined. The cost of moving inventory must also be determined. Additional constraints include the amount of available storage at each node, the availability of transportation, the times of day that inventory can be delivered, minimum order sizes, order frequency cycle restrictions, vendor restrictions, etc.

Safety stock is extra inventory maintained to mitigate risk of stockouts (shortfalls in available inventory). The inventory allocation engine 320 will provide future need-by date and times for optimal replenishment thresholds by item and location in stores and safety stock levels in flow centers and receive centers to reflect 1) initial inventory positioning for new items 2) changes in positioning to support upcoming sales events/promotions or 3) inventory movements required to rebalance safety stock across the network. Pro-active transfers move inventory from receive center to receive center, receive center to flow center, flow center to flow center and flow center to store.

The first problem of determining the optimal inventory positions can be solved by leveraging and expanding upon an optimal inventory policy approach for multi-echelon supply chains developed by Clark-Scarf. Clark-Scarf's approach will do joint optimization across all nodes considering inputs such as forecasted probability of demand, availability goals and trade off costs (cost to hold, cost to move, etc.) for each node to support availability for a customer. The forecasted probability of demand is determined for each item at each location for a given timeframe by the demand forecast engine 212. This determines the probability of selling or fulfilling a particular quantity of an item, at each location, each day of the week, and whether that materially changes based on the time of year. The forecasted probability of demand also accounts for upcoming known promotions as well as historical lost sales due to stock-outs.

When the inventory management system 200 considers multiple retail locations serviced by a flow center and multiple flow centers served by a receiving center, it is able to take advantage of risk pooling between all the locations. Demand variability is reduced when demand is aggregated across all the locations. Such an effect is described in further detail below in connection with FIG. 8. The reduction in variability allows for retail locations to decrease the amount of safety stock held, and also decrease the average amount of inventory held in general. Receive centers and flow centers are able to quickly redeploy inventory between nodes and retail locations and to ship in eaches, which allows retail locations to carry less safety stock.

The product availability goal is determined by the overall retail enterprise and is the amount of availability for each item at each location at different time periods that is set for both online and in-store customers. For example, pumpkin pie filling may have a higher availability goal at Thanksgiving than other times of year. Availability goals can be adjusted to reflect the importance of the product to the customers at that time of year.

In some embodiments, the inventory allocation engine 320 applies a number of rules based on the "order-to level" ("OTL"), i.e., the level of inventory to be maintained at each node within the supply chain. Generally, this can, in prior systems, cause problems. Typically, ordering to OTL levels works well because nodes will not require additional units once overstocked; however, in situations where inventory is force-shipped to the node, problems arise. These can occur, for example, in flow-vs-reserve, not-legal-for-storage (the node cannot hold the item overnight), and get-out-logic scenarios. As explained in a more detailed example below, this can result in a situation where the OTL of an upstream node (e.g., a flow center) can be greater than the sum of downstream linked nodes (e.g., stores). Furthermore, in preexisting systems because all nodes are stocked by the case (in the example of smaller, case-packed items), a flow center can be drastically overstocked, since each case was previously individually shipped to a store, despite the store's OTL level being below the number of items in the case. The flow center would therefore be far above the OTL level for the sum of OTLs of the stores, by the amount the case exceeds a store OTL level multiplied by the number of stores that are supplied by that flow center.

In accordance with the present disclosure, the inventory movement analyzer 303 applies one or more policies that are useable to manage movements among nodes to reduce instances of overstock while improving rates of availability of items. For example, in some embodiments, existing policies are modified. In particular embodiments, an OTL policy does not use a capped inventory position. In still further particular embodiments, an S-s policy can be used that builds a "saw tooth" pattern of inventory at some nodes (e.g., flow centers), which can be useful for replenishment in systems that involve fixed costs (e.g., fixed costs for replenishment); this can allow for reduced cost by performing periodic/predictable replenishment to or from the flow center.

In additional embodiments, the inventory allocation engine 320 applies an aggregating policy, in which two or more policies are combined for a particular node. Using the Clark-Scarf methodology (discussed further below), a balance assumption results in a lower bound on an amount of inventory that may be required at a particular node; other policy types can be applied to express an upper-bound estimate. Therefore the combination of policies—for example, an aggregating policy and a minimum stock level policy, can be used to cap a request to maximum inventory required at a node. Still further, in some embodiments, a force-push policy can be employed (extending an allocation rule) to define how excess inventory may be force-pushed from an upstream node to nodes further downstream.

As understandable from the above, the inventory allocation engine 320 can perform such functions on a per-node (or per-node-type) basis. For example, a combination of policies, such as aggregating and minimum stock level, may be applied (in conjunction with a force-push policy) at a flow center, while a different type of policy (e.g., sawtooth, etc.) may be applied at selected nodes (e.g., stores) for which delivery costs may be substantial (e.g., due to being further from a flow center than other nodes). Different nodes at a same level may have the same or different policies, with inventory policies tuned to reduce inventory on hand while improving availability to, e.g., better than 98% availability levels.

Figure 4:
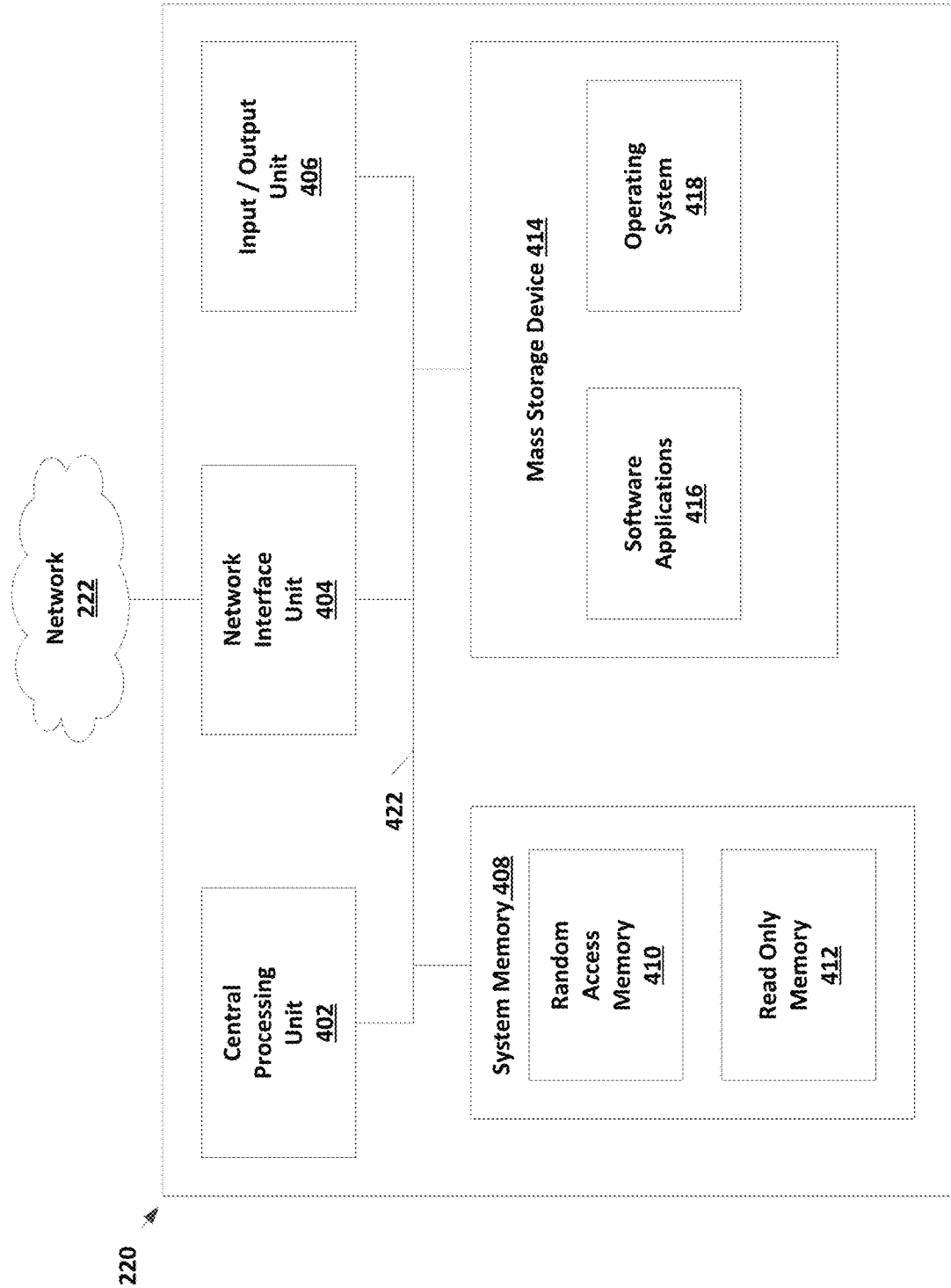
FIG. 4 illustrates an example block diagram of a computing system usable in the supply chain management system of FIG. 2.

Referring now to FIG. 4, an example block diagram of a computing system 220 is shown that is useable to implement aspects of the supply chain management system 202 of FIG. 2. In the embodiment shown, the computing system 220 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing system 220, such as during startup, is stored in the ROM 412. The computing system 220 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing system 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 220.

According to various embodiments of the invention, the computing system 220 may operate in a networked environment using logical connections to remote network devices through a network 222, such as a wireless network, the Internet, or another type of network. The computing system 220 may connect to the network 222 through a network interface unit 404 connected to the system bus 422. It should be appreciated that the network interface unit 404 may also be utilized to connect to other types of networks and remote computing systems. The computing system 220 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing system 220 can store software instructions and data. The software instructions include an operating system 418 suitable for controlling the operation of the computing system 220. The mass storage device 414 and/or the RAM 410 also store software instructions, that when executed by the CPU 402, cause the computing system 220 to provide the functionality discussed in this document. For example, the mass storage device 414 and/or the RAM 410 can store software instructions that, when executed by the CPU 402, cause the computing system 220 to receive and analyze inventory and demand data.

Figure 5:
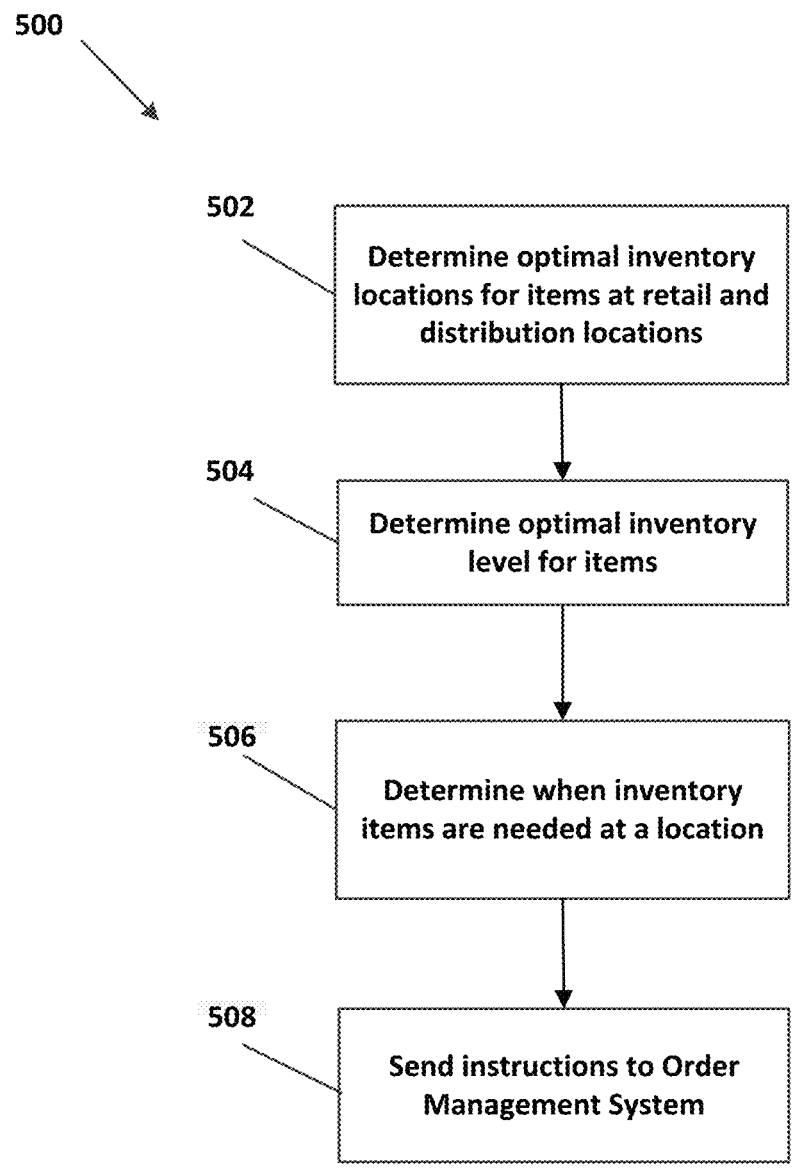
FIG. 5 is a flow chart of an example method of managing inventory in a retail supply chain.

FIG. 5 displays a flow diagram of a method 500 of managing inventory information in accordance with the present disclosure. In particular, the method 500 can generate and send instructions to the order management system within the enterprise supply chain as illustrated in FIGS. 1-3, above, based, for example, on desired inventory levels and/or positions within the supply chain network. The supply chain includes a plurality of retail locations and a plurality of distribution locations. The supply chain may be structured as the example supply chain depicted in FIG. 1. In some embodiments, the method 500 is performed by the inventory management system such as the system 200 of FIG. 2. In some instances, the method 500 is performed using a software tool such as can include the inventory allocation engine 320, the inventory movement analyzer 303, and which exposes a user interface 214 for user interaction.

In example implementations, the method 500 can be performed either periodically or in response to one or more signals from point of sale systems indicating a change in inventory levels at one or more locations within the supply chain. In such instances, to the extent the method 500 results in a transfer order requesting movement of items among nodes, the method 500 can generate movement requests over the course of a day, week, month, etc., which are aggregated and executed at a time of a scheduled delivery route between nodes.

At operation 502, the optimal inventory location for each of a plurality of items at each of the plurality of retail locations and distribution locations is determined. Optimal inventory locations are determined by the inventory allocation engine 320 of FIG. 3. Inventory is held at these locations in order to quickly replenish stock in response to expected customer demand from stores and online sales. In some embodiments, the inventory positions are monitored by the inventory-tracking engine 302. The inventory-tracking engine 302 receives updates on inventory positions from the transportation management system 206 and the warehouse management engine 308 as items flows through the supply chain. Changes are recorded in the inventory data store 314.

The optimal inventory location for each item is determined by a forecasted demand probability distribution for each item at each location at each time period. The demand probability distribution determines the probability of selling or fulfilling a particular quantity of an item at each location, at each time period. A time period may be a day of the week, and considers the time of the year. The demand probability distribution also considers upcoming known promotions and historical lost sales due to stock-outs.

In particular examples, the calculation of the demand probability distribution can be performed selectively for a plurality of locations within the supply chain, or in any event, can be performed on a grouped or collective basis for that plurality of locations. For example, in some cases, the demand probability distribution for each of a plurality of retail locations can be calculated for a particular item or items, and these probability distributions can be used in determining a probability distribution for demand at a flow center servicing those retail locations. Although a level of uncertainty regarding demand at each of the plurality of retail locations may be substantial, the demand at each location can be aggregated at the flow center to determine a likely need for items to restock each of the retail locations. Because the likelihood of all of those retail locations being exhausted of stock of a particular item is much lower than a likelihood of a single location being exhausted of stock, the aggregated demand from a flow center servicing those retail locations is less subject to variability than each individual retail location. As such, the flow center may have a probability distribution that is has less variability or uncertainty that each of the retail locations. This allows the flow center to be stocked to the same predetermined probability level (e.g., 98% demand met) while maintaining a lower inventory stock.

At operation 504, the inventory levels of the plurality of items at each of the nodes is determined. As described above, the optimal inventory location dictate the number of units of each item that are to be held at each node within the supply chain for a given timeframe. Once optimal inventory positions are established, the inventory management system 202 will use the current inventory levels (monitored by the Inventory Tracking Engine 302) and calculated future optimal inventory positions (including the time they are needed in the receiving destination) to pre-position inventory for upcoming events (promotions, sales plans, new item sets, etc.) or other expected changes in sales patterns. For example, stock required in a few days may be maintained at a flow center, while only immediately-needed stock may be positioned at each retail location.

Desired inventory levels are determined by the guest availability goal for each item at each location at different time periods. The availability goal is determined by aligning the importance of each item to customers at each time period. For example, pumpkin pie filling has a higher availability goal during Thanksgiving because customers desire pumpkin pie filling at this time period. During other time periods, pumpkin pie filling has a low availability goal because it is less desirable to customers. Guest availability goals are also impacted by retail shopping verses online shopping. When shopping online, guests are often seeking specific items verses browsing, and are less willing to trade off for a similar item.

At operation 506, the time when an inventory item is needed is determined. Once the time when inventory items are needed is determined, the inventory management system 202 will send instructions to the transportation management system 206 (monitored by the transportation database 312). The transportation management system 206 will schedule deliveries of shipments and execute delivery services to assure inventory items are at each of the nodes when needed.

The transportation management system 206 considers the cost of holding inventory at different times at each location. The cost of holding inventory is determined by considering whether and when it is more advantageous to hold inventory upstream in a flow center or receiving center or sending additional inventory to the retail location. The cost of holding inventory includes factors such as interest on inventory, storage and maintenance costs, real estate, and similar other costs. The desired guest availability (in store and online) is balanced with the cost of holding an inventory item in a node to support the desired guest availability. This results in a portion of the required inventory being held upstream instead of exclusively at a retail location. How much can be held at a distribution center and flow center is governed by the transit lead times between nodes and balancing guest availability with inventory holding costs at each node.

At operation 508, instructions are sent to the order management system. The instructions determine how much inventory should be carried at any time period, where the inventory items should be located, and when the inventory items are needed. The order management system directs movement of inventory to retail stores and distribution centers that require replenishment to achieve the optimal inventory positions that were determined. The inventory tracking engine 302 receives notifications of the new locations of items within the supply chain and communicates that information to the inventory data store 314.

Customer availability goals are received for each of the retail and distribution locations. In some embodiments, customer availability goals are set by a user through the computing device 220 and are communicated to the inventory allocation engine 320 as described above with reference to the guest availability goal. Guest availability goals may change depending on seasons or promotions. As discussed above, the goal can be set to control overall inventory strategies for a supply chain.

Referring to FIG. 5 generally, it is noted that in situations where a supply chain includes a large number of nodes, or locations, it may be impractical to calculate collectively the demand probability distribution and balance of items across the supply chain for all nodes. However, the method can be implemented in a software tool as noted above, using a selectively-recalculating methodology. In some implementations, the method 500 can be implemented in a Haskell programming environment, which performs "lazy" reevaluation of a model that is implemented. In the context of this inventory model, lazy reevaluation means that only those nodes that are affected by a change in inventory or a change in a particular node's statistical model of anticipated demand will only affect recalculations of adjacent nodes, or nodes that would be affected. For example, a change in a statistical model for a particular retail location may affect models for an affected flow center that provides items to that retail location and an associated receive center from which that flow center receives items. However, it may not include, for example, other flow centers and/or receive centers that are not in a geographical location common with the retail location, and therefore would not generally be affected by recalculation of demand and inventory modeling at the retail location.

As a particular illustration of the above, it is noted that traditional inventory models use simple calculations that do not include determining inventory levels at all nodes. For example, inventory that is force-shipped to a node (i.e., store) can result in an overstock of inventory at a particular node. This often occurs in situations where the flow center has no inventory on hand and orders, for example, two units on day 1. No demand is experienced at either store being serviced by the flow center, so there is no reactive replenishment on day 1. At the end of day 1, the flow center force-pushes its two inventory unit to the stores. Therefore, each store is overstocked by one unit at the end of day 1. On day 2 the flow center orders more inventory units based on the capped inventory position. By the end of day 2, the two units have been sent from the flow center to the store, and if the stores have not seen any demand, the stores are overstocked by two units now. This process can repeat itself every day. This problem occurs when the OTL level does not take into consideration the inventory levels at stores serviced by the flow center.

The methodology described in the present disclosure builds upon such traditional inventory models, but includes additional policies. For example, the OTL level may not use capped inventory positions to determine when inventory needs to be ordered. Post-optimization tools may modify policies that are associated with high fixed-costs methods. As previously noted, another method includes using two or more policies to compute an aggregate policy. An aggregate policy may compute an upper-bound approximate inventory level and use the Clark-Scarf algorithm to compute a lower-bound approximate inventory level. Force-push policies may additionally include rules to determine how and where excess inventory is pushed.

Figure 6:
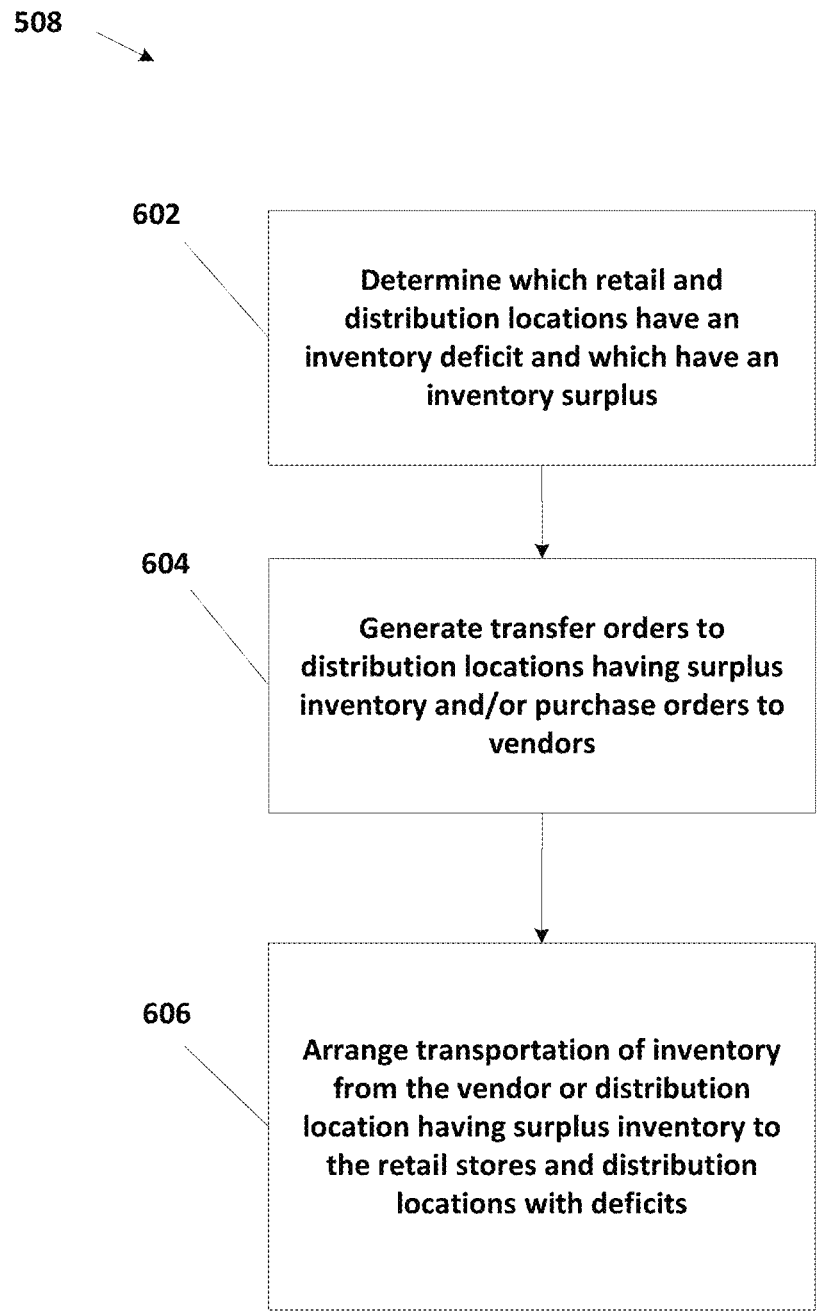
FIG. 6 is flow chart of an example method of replenishing inventory to achieve optimal inventory positions.

FIG. 6 illustrates an example method 508 of sending instructions to the order management system 202. The replenishment management system 204 operates in conjunction with the inventory management system 202 to identify when and where inventory needs to be moved between nodes with a supply chain.

At operation 602, it is determined which retail locations and distribution locations have an inventory deficit and which have an inventory surplus. The inventory tracking engine 302 tracks the inventory levels at the plurality of retail and distribution locations and compares the current inventory levels with the optimal inventory positions determined by the inventory allocation engine 320. A location is determined to have a deficit when the number of units of a particular item are below the amount required by the optimal inventory position for that item in that location on that day. In some embodiments, a location is considered to have a surplus of an item if there are more units of that item than the optimal inventory position requires. In other embodiments, a location is considered to have a surplus of an item if it is determined that benefit of transferring one or more units of an item to another location will provide more benefits then detriments to the overall retail. The inventory-tracking engine 302 determines in real-time which locations need replenishment.

At operation 604, transfer orders and/or purchase orders are generated. If there is surplus inventory available at one or more other nodes in the supply chain, the transfer order generator 304 issues transfer orders to those other nodes to transport units of the needed item to nodes experiencing an inventory deficit. If there is not surplus inventory available at other nodes in the supply chain or the cost analyzer 322 has determined that the cost of transferring inventory to the nodes having a deficit outweighs the cost of ordering new inventory, a purchase order is issued by the purchase order generator 306. The purchase order is communicated to the vendor that produces the required item, as well as to the transportation management system 206.

At operation 606, transportation of inventory is arranged. For purchase orders, the transportation management system 206 arranges transportation from the vendor to the location having an inventory deficit. For transfer orders, the transportation management system 206 arranges transportation from the distribution location having a surplus to the location having an inventory deficit.

As seen in FIGS. 7-9, various inventory levels and replenishment strategies are illustrated which can be implemented within the supply chain management system described herein. For example, in FIG. 7, a demand probability distribution is illustrated, in an example embodiment.

The demand probability distribution is often represented as a histogram, as shown in the example of FIG. 7, where each bar represents the percentage chance of a certain number of sales units. The line represents an accumulation of each percentage units are added to the right. Probability distributions vary significantly in shape based on how an item sells (fast, slow, sells in multiples, short life, long life, etc.) and its historical sales variability. They also can look different day by day, and for the same day at different times of the year. It is the shape of these distributions and how they change over time that allow the system to account for the different types of business a retailer runs (referred to as push, pull, push/chase, limited time offer, etc.). Examples of demand distributions for two different items are displayed in FIG. 8.

The distribution shows what rate of sale is most likely to occur (about 4 units in the example of FIG. 7) and by extension the inventory that would be needed to support it. Based on the cumulative probability line however, carrying only 4 units would cause a missed sale for any demand higher than 4 which in the above demand distribution has a nearly 50% chance of occurring. To capture sales higher than the most likely, additional inventory must be carried. How much more is determined by the availability goal.

The availability goal effectively dictates what cumulative percent of possible sales values must be made possible. In the example of FIG. 7, there is a ~55% chance of selling 4 units or less. Carrying 4 units would be the equivalent of a 55% availability goal. To be 90% available, 9 units must be held on the day represented by the distribution. By choosing to hold 9, the system forgoes the chance to sell 10 or 11. The availability goal is the largest controllable lever in determining the amount of inventory that is carried within a retail enterprise supply chain.

FIG. 8 illustrates a demand distribution curve for an individual item at a retail store. The availability goal is represented at 98%, meaning that the item is available at the retail store 98% of the time a customer wants to purchase it. FIG. 8 shows two different item demand curves. In some examples, the top curve can represent an item with a consistent rate of sale, so less inventory is required to meet a given availability goal. The bottom curve can represent an item with an uncertain rate of sale, so more inventory is required to meet a given availability goal.

It is noted that this same effect may be used within a large supply chain to strategically reduce overall stock levels. In particular, although there may be some uncertainty regarding a rate of sale of a particular item at one location, that uncertainty can be reduced by aggregating likely sales across a plurality of locations. As such, in secondary locations where items are staged for delivery (e.g., at a flow center), stocking levels may be determined with a greater level of certainty despite a relatively lower uncertainty at different points of sale associated with the same secondary location. As such, despite uncertainty at retail locations, within an overall supply chain such as that shown in FIG. 1, uncertainty at flow centers and/or receive centers is reduced.

FIG. 9 is a graph illustrating the replenishment process described above. The vertical axis represents the optimal inventory levels or positions for a given store (in units) and the horizontal axis represents time given in days. In this example, the optimal inventory levels are modified for a promotion of a new item being offered for sale in the store.

At day 1, the initial demand probability forecast for the new item is determined, and the inventory allocation engine 320 has set the optimal inventory level to 5 units. Based on the optimal inventory level set by the inventory allocation engine 320, the proactive replenishment engine 316 issues instructions to the inventory management system 202 to transfer 5 units to the store. At this point, it is also determined that the upstream flow center for this store (not represented in the graph) needs 4 units of safety stock to support the future needs of the store. The inventory management system 202 also facilitates transfer of stock to the flow center to meet the optimal inventory levels determined by the inventory allocation engine 320.

Demand signals are received at the reactive replenishment engine 318 on day 2 in response to sales. In response to the sales of 2 units on day 2, the reactive replenishment engine 318 signals to the inventory management system 202 a request for 2 units. The transfer order generator 304 then issues a transfer order to move 2 units of the item from the flow center to the store. The same process is repeated on day 3 when 3 units are sold and 3 units are then replenished with a reactive transfer.

On day 4, the inventory allocation engine 320 receives notice that there will be an upcoming promotion on day 5 and calculates the optimal inventory level to be 10 units. A proactive transfer is triggered by the proactive replenishment engine 316 in order to position 10 units at the store by day 5. In addition, another unit was sold at the store, triggering a reactive transfer of an additional unit. Meanwhile, upstream the flow center is receiving additional stock from receive centers and vendors to maintain its needed inventory levels.

Promotional sales begin on day 5 and 1 to 1 replenishment continues in the form of reactive transfers through day 6.

On day 6, the inventory allocation engine 308 determines that the optimal inventory levels should be reduced in light of the end of the promotion. Reactive replenishment is paused to allow the inventory at the store to sell down to a new optimal inventory level of 4 units. The sell down process lasts until day 9, when the inventory level at the store reaches the optimal inventory level of 4 units.

1 to 1 reactive replenishment resumes on day 10 to maintain the optimal inventory level of 4 units at the store. Reactive transfers maintain the inventory level at 4 units through day 11.

It is noted that, in the scenario of FIG. 9, each of the set inventory levels for each day are set based on statistical analysis (e.g., using the Clark-Scarf approach at each node or node group within a supply chain), with the actual sales being used to continually improve the prediction of sales of each item.

Figure 10:
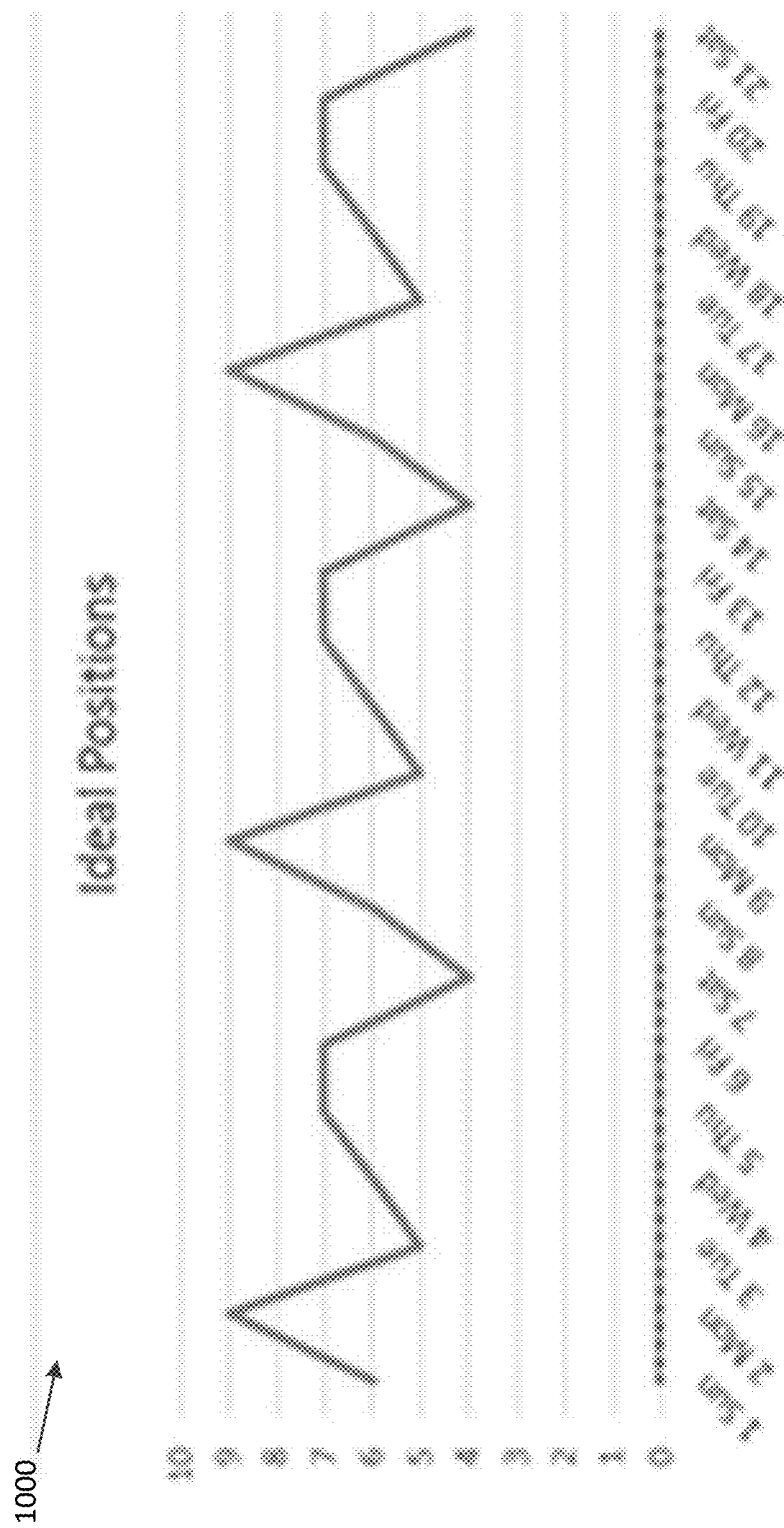
FIG. 10 is a graph illustrating the demand of an item on a daily basis.

FIG. 10 illustrates an availability goal for an item during current and future time periods. As shown, the availability goal for the item fluctuates daily and is used to determine how much inventory to purchase or transfer on a given day.

Referring to FIGS. 1-10 generally, it is noted that the improved inventory balance across all nodes within the organization has a number of advantageous effects, in particular when combined with improved methods of physical movement of goods. For example, such improved prediction allows for decrease of "out of stock" events from 6-8% to less than 2% of occurrences or better. Still further, ideal inventory positions can be assessed using improved logic to pool risks of demand spikes at a flow center or flow centers (i.e., managing risk of higher than expected demand being by offsetting against lower demand elsewhere).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A method of managing inventory items within a supply chain, the method comprising:

receiving, at a software platform implemented on a supply chain management computing system, inputs related to a plurality of inventory items, the inputs being received from a transportation management computing system and including a set of defined constraints including a cost of holding each of the plurality of inventory items at a location type and a cost of moving each of the plurality of inventory items between locations, wherein a plurality of locations within the supply chain includes a plurality of retail locations, a receiving center, and a flow center servicing the plurality of retail locations;

determining, at a replenishment management system included within the software platform, for each individual inventory item and across a plurality of different inventory item stock keeping units (SKUs), an optimal inventory balance across the plurality of locations for a predetermined future time period, wherein the optimal inventory balance is a discreet number of individual inventory items of each SKU at each of the plurality of inventory locations, wherein determining the optimal inventory balance includes:

receiving demand signals from a point of sale system within an enterprise;

assigning a predetermined statistical availability level at each of the plurality of retail locations that is based on a desired customer availability at each of the plurality of retail locations for the predetermined future time period and based on a level of uncertainty regarding consumer demand;

assigning a predetermined statistical availability level at the flow center that is based on a second level of uncertainty representing a collective uncertainty across the plurality of retail locations, wherein the second level of uncertainty is lower than the level of uncertainty at each of the plurality of retail locations, the predetermined statistical availability level representing a cumulative percent of possible sales values; and receiving demand forecast information from a demand forecasting engine, the demand forecast information defining a statistical distribution of estimated demand representing a distribution of sales volume outcomes for each SKU at each of the plurality of locations for the predetermined future time period, the plurality of locations including the flow center and the plurality of retail locations, the statistical distribution of estimated demand serving to aggregate the demand across the plurality of locations to reduce demand variability allowing the plurality of locations to decrease an average amount of the plurality of inventory items held at the plurality of locations;

providing the optimal inventory balance from the replenishment management system to an inventory management system included within the software platform;

responsive to the determination of the optimal inventory balance, automatically generating, at the inventory management system, and based on the set of defined constraints, one or more inventory adjustment requests to achieve the optimal inventory balance across each of the plurality of locations for each of the plurality of inventory items, the inventory adjustment requests resulting in an inventory status satisfying the predetermined statistical availability level given the statistical distribution of estimated demand for each of the plurality of inventory items, the inventory adjustment requests being selected from among a transfer order or rebalance order to initiate movement of a discrete number of inventory items within the enterprise on a per-item basis, or a purchase order to a vendor to order additional inventory items;

responsive to generating the one or more inventory adjustment requests, communicating the one or more inventory adjustment requests from the supply chain management computing system to the transportation management computing system, thereby effectuating movement of inventory items among the plurality of locations within the supply chain; and responsive to receipt of the one or more inventory adjustment requests, scheduling and executing, by the transportation management computing system, deliveries of shipments by delivery services of at least one item of the plurality of inventory items.

2. The method of claim 1, further comprising automatically determining an appropriate unit of measurement for each of the plurality of inventory items at each of the plurality of locations.

3. The method of claim 1, wherein an appropriate unit of measurement is selected from a pallet, a case, and an each.

4. The method of claim 1, wherein the predetermined statistical availability level is at least 98% availability at the retail location.

5. The method of claim 1, wherein the inputs further include future events comprising promotions, sales plans, inventory item goals, and expected changes in sales patterns.

6. The method of claim 1, wherein the inputs further include at least one of costs of moving the inventory item between locations, current inventory item levels at each location, and transit time to transfer the inventory item between locations.

7. The method of claim 1, wherein the rebalance order includes the amount of inventory items to be moved, where the inventory items are to be moved, and when the inventory items are needed at the location.

8. The method of claim 1, wherein an optimal inventory balance for a flow center among the plurality of flow centers is based at least in part on optimal inventory balances at each of a plurality of related retail locations, and wherein the optimal inventory balances of each of the plurality of related retail locations is based on the predetermined statistical availability level.

9. The method of claim 1, further comprising generating via the software tool a user interface providing a selectable view of current and optimal inventory balances at one or more of the plurality of locations.

10. The method of claim 9, further comprising receiving, via the software platform, an input identifying the predetermined statistical availability level for at least one item across the plurality of locations.

11. A non-transitory computer-readable medium comprising computer-executable instructions which, when executed by a computing system cause the computing system to perform a method of managing inventory items in a supply chain, the method comprising:

receiving from a transportation management computing system, at a software platform implemented on a supply chain management computing system, inputs related to a plurality of inventory items, the inputs being received from a transportation management computing system and including a set of defined constraints including a cost of holding each of the plurality of inventory items at a location type and a cost of moving each of the plurality of inventory items between locations, wherein a plurality of locations within the supply chain includes a plurality of retail locations, a receiving center, and a flow center servicing the plurality of retail locations;

determining, at a replenishment management system included within the software platform, individually for each individual inventory item and across a plurality of different inventory item stock keeping units (SKUs), an optimal inventory balance across the plurality of locations for a predetermined future time period, wherein the optimal inventory balance is a discreet number of individual inventory items of each SKU at each of the plurality of inventory locations, wherein determining the optimal inventory balance includes:

receiving demand signals from a point of sale system within an enterprise;

assigning a predetermined statistical availability level at each of the plurality of retail locations that is based on a desired customer availability of the inventory item at each of the plurality of retail locations for the predetermined future time period and based on a level of uncertainty regarding consumer demand;

assigning a predetermined statistical availability level at the flow center that is based on a second level of uncertainty based on representing a collective uncertainty across the plurality of retail locations, wherein the second level of uncertainty is lower than the level of uncertainty at each of the plurality of retail locations, the predetermined statistical availability level representing a cumulative percent of possible sales values; and receiving demand forecast information from a demand forecasting engine, the demand forecast information defining a statistical distribution of estimated demand representing a distribution of sales volume outcomes for each SKU of the plurality of inventory items at each of the plurality of locations for the predetermined future time period, the plurality of locations including the flow center and the plurality of retail locations, the statistical distribution of estimated demand serving to aggregate the demand across the plurality of locations to reduce demand variability allowing the plurality of locations to decrease an average amount of the plurality of inventory items held at the plurality of locations;

providing the optimal inventory balance from the replenishment management system to an inventory management system included within the software platform;

responsive to the determination of the optimal inventory balance, automatically generating, at the inventory management system, and based on the set of defined constraints, one or more inventory adjustment requests to achieve the optimal inventory balance across each of the plurality of locations for each of the plurality of inventory items, the inventory adjustment requests resulting in an inventory status while satisfying the predetermined statistical availability level given the statistical distribution of estimated demand for each of the plurality of inventory items, the inventory adjustment requests being selected from among a transfer order or rebalance order to initiate movement of a discrete number of inventory items within the enterprise on a per-item basis, or a purchase order to a vendor to order additional inventory items;

responsive to generating the one or more inventory adjustment requests, communicating the one or more inventory adjustment requests from the supply chain management computing system to the transportation management computing system, thereby effectuating movement of inventory items among the plurality of locations within the supply chain; and responsive to receipt of the one or more inventory adjustment requests, scheduling and executing, by the transportation management computing system, deliveries of shipments by delivery services of at least one item of the plurality of inventory items.

12. The method of claim 11, wherein the desired customer availability is at least 98% availability at the retail location.

13. The method of claim 11, wherein an appropriate unit of measurement is selected from a pallet, a case, and an each.

14. The method of claim 11, wherein the inputs further include future events comprising promotions, sales plans, inventory item goals, and expected changes in sales patterns.

15. The method of claim 11, wherein the inputs further include at least one of costs of moving the inventory item between locations, current inventory item levels at each location, and transit time to transfer the inventory item between locations.

16. The method of claim 11, wherein the rebalance order includes the amount of inventory items to be moved, where the inventory items are to be moved, and when the inventory items are needed at the location.

17. A system for managing inventory items within a supply chain, the system comprising:

a supply chain management computing system comprising at least one processor communicatively connected to a memory, the memory storing computer-executable instructions comprising a software platform which, when executed, causes the supply chain management computing system to:

receive inputs related to a plurality of inventory items, the inputs being received from a transportation management computing system and including a set of defined constraints including a cost of holding each of the plurality of inventory items at a location type and a cost of moving each of the plurality of inventory items between locations, wherein a plurality of locations within the supply chain includes a plurality of retail locations, a receiving center, and a flow center servicing the plurality of retail locations;

determine, at a replenishment management system included within the software platform, individually for each individual inventory item and across a plurality of different inventory item stock keeping units (SKUs), an optimal inventory balance collectively across a plurality of locations based on a predetermined restocking time period for a predetermined future time period, wherein the optimal inventory balance is a discreet number of individual inventory items of each SKU at each of the plurality of inventory locations, wherein determining the optimal inventory balance includes:

receiving demand signals from a point of sale system within an enterprise;

assigning a predetermined statistical availability level at each of the plurality of retail locations that is based on a desired customer availability of the inventory item at each of the plurality of retail locations for the predetermined future time period and based on a level of uncertainty regarding consumer demand for the inventory item, assigning a predetermined statistical availability level at the flow center that is based on a second level of uncertainty based on representing a collective uncertainty across the plurality of retail locations, wherein the second level of uncertainty is lower than the level of uncertainty at each of the plurality of retail locations, the predetermined statistical availability level representing a cumulative percent of possible sales values that are made possible, and receiving demand forecast information from a demand forecasting engine, the demand forecast information defining a statistical distribution of estimated demand representing a distribution of sales volume outcomes for each SKU of the plurality of inventory items at each of the plurality of locations for the predetermined future time period, the plurality of locations including the flow center and the plurality of retail locations, the statistical distribution of estimated demand serving to aggregate the demand across the plurality of locations to reduce demand variability allowing the plurality of locations to decrease an average amount of the plurality of inventory items held at the plurality of locations;

provide the optimal inventory balance from the replenishment management system to an inventory management system included within the software platform;

responsive to the determination of the optimal inventory balance, automatically generating, at the inventory management system, and based on the set of defined constraints, one or more inventory adjustment requests to achieve the optimal inventory balance across each of the plurality of locations for each of the plurality of inventory items, the inventory adjustment requests resulting in an inventory status while satisfying the predetermined statistical availability level given the statistical distribution of estimated demand for each of the plurality of inventory items, the inventory adjustment requests being selected from among a transfer order or rebalance order to initiate movement of a discrete number of inventory items within the enterprise on a per-item basis, or a purchase order to a vendor to order additional inventory items;

responsive to generating the one or more inventory adjustment requests, communicating the one or more inventory adjustment requests from the supply chain management computing system to the transportation management computing system, thereby effectuating movement of inventory items among the plurality of locations within the supply chain; and responsive to receipt of the one or more inventory adjustment requests, scheduling and executing, by the transportation management computing system, deliveries of shipments by delivery services of at least one item of the plurality of inventory items.

18. The system of claim 17, wherein the inputs related to at least one item of the plurality of inventory items include information defining whether the item is perishable or non-perishable.

19. The system of claim 17, wherein the plurality of locations comprises fewer than all of the locations included in a supply chain of an enterprise, the plurality of locations comprising locations which are each affected by changes to inventory levels at one of the plurality of locations.

* * * * *